March 25, 1941. V. STANZEL 2,236,348
CONTROL FOR MINIATURE AIRPLANES
Filed Nov. 6, 1939 2 Sheets-Sheet 1

Inventor
VICTOR STANZEL

By E. V. Hardway
Attorney

March 25, 1941.  V. STANZEL  2,236,348
CONTROL FOR MINIATURE AIRPLANES
Filed Nov. 6, 1939  2 Sheets-Sheet 2

Inventor
VICTOR STANZEL

By
E. V. Hardway
Attorney

Patented Mar. 25, 1941

2,236,348

UNITED STATES PATENT OFFICE 2,236,348

CONTROL FOR MINIATURE AIRPLANES

Victor Stanzel, Schulenburg, Tex.

Application November 6, 1939, Serial No. 303,088

7 Claims. (Cl. 46—77)

This invention relates to a control for a miniature airplane.

An object of the invention is to provide an airplane preferably, though not necessarily, a power driven plane having a guide line attached thereto in such manner that the elevation of the plane may be controlled as the plane moves in an approximately circular course.

Another object of the invention is to provide additional means connected to the line whereby the motor of the plane may be cut off, or stopped, at will while the plane is in flight.

Another object of the invention is to provide a model, or miniature, airplane having a guide line so attached thereto, so as to give the plane lateral and longitudinal stability which can be varied or controlled by an operator on the ground as will be more fully explained hereinafter.

With the above and other objects in view the invention has particular relation to certain novel features of construction, operation and arrangement of parts, an example of which is given in this specification and illustrated in the accompanying drawings, wherein.

Figure 1:
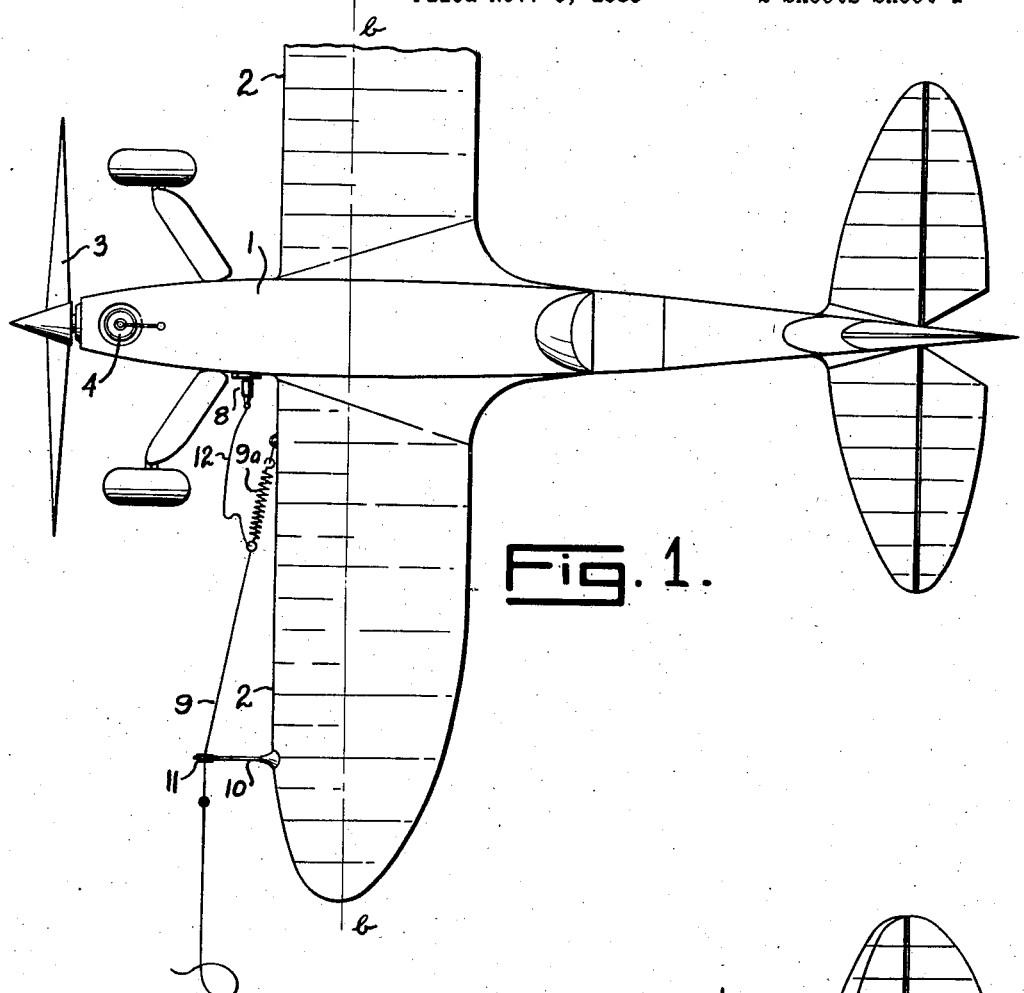
Figure 1 shows a plan view of a conventional miniature speed plane.
Figure 2:
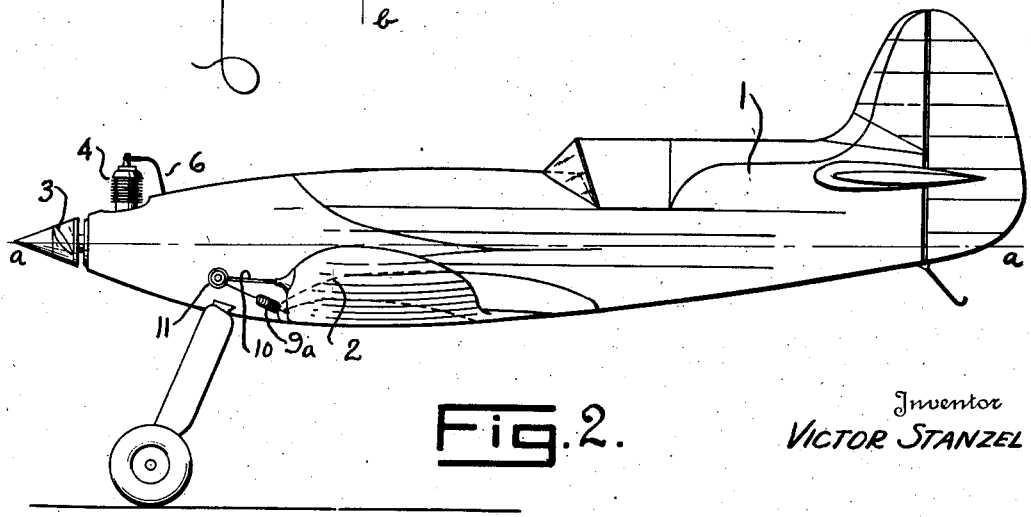
Figure 2 shows a side view.
Figure 3:
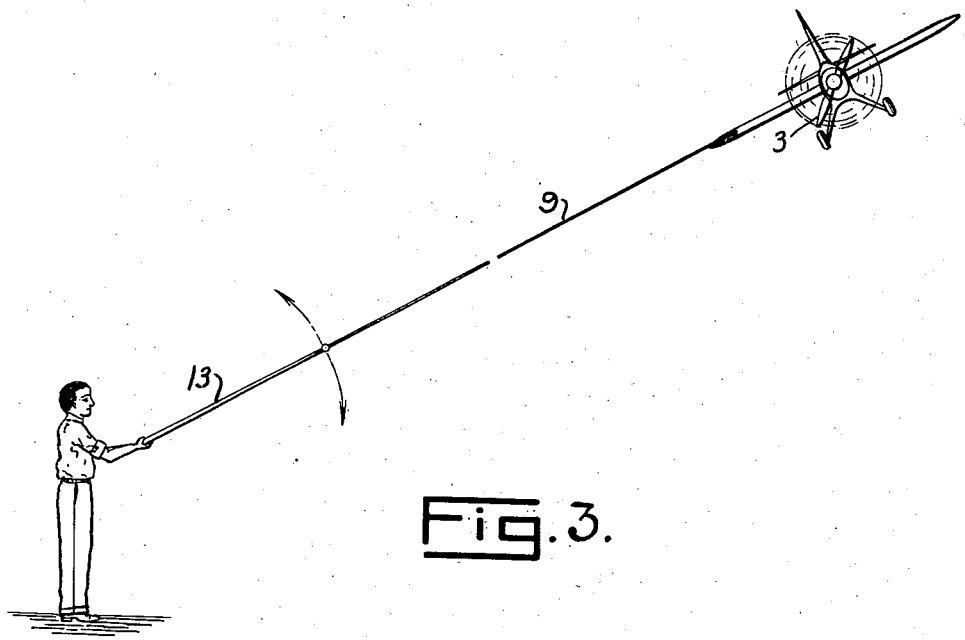
Figure 3 shows a front elevation of the plane in flight.
Figure 4:
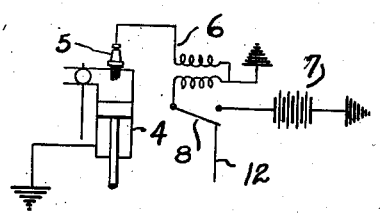
Figure 4 shows a wiring diagram.

Referring now more particularly to the drawings wherein like numerals of reference designate the same parts in each of the figures, the numeral I designates the fuselage as a whole having the lateral wings or planes 2, 2. As illustrated the plane is equipped with a conventional propeller 3 which is fixed on the forward end of the drive shaft of the motor 4. A gasoline motor is shown in the illustration having a spark plug 5 which is connected into the electrical circuit 6, a battery 7 furnishing the electrical current. The circuit is provided with a switch 8 which may be readily opened or closed as later explained.

In the illustration the line a—a represents the central axis of the airplane while the line b—b represents the center of lift of the wings, said lines intersecting at the center of gravity of the plane. The numeral 9 designates a guide line. One end of this line is attached to the plane at a point in front of the center of lift of the wings. As shown in the present illustration there is an arm 10 attached to and extending forwardly from the leading edge of a wing 2 and is provided, at its forward end, with an eye 11. The guide line 9 extends through this eye and is attached to the leading edge of the wing at a point near the fuselage and is provided with an elastic section 9a preferably formed of a coil spring. It will be thus seen that the point of attachment of the guide line to the plane is outward from the central axis of the fuselage and forward of the center of gravity of the plane.

While the plane is in motion the switch 8 is closed. The switch may be of the ordinary plug type and connected to the guide line 9 outwardly of the elastic section 9a and also connected to the plug switch 8 there is a cord 12 which is normally slack.

While the airplane is flying around its course the tension of the spring 9a is sufficient to overcome the pull of the plane on the guide line 9 so that the cord 12 will remain slack. However, should it be desired to stop the motor a slight jerk on the line 9 will lengthen the spring 9a taking up the slack of the cord 12 and pulling out the plug of the switch 8 thus cutting off the ignition of the motor and causing the motor to stop.

In use it will usually be found most convenient to use a rigid pole 13, to be held by the operator, and to the end of which the lower end of the guide line 9 is attached, although the guide line itself may be held in the hand of the operator while flying the plane if so desired.

In flight the model airplane has a tendency to follow a substantially circular course but has a strong tendency to climb sharply when flying, head on, into the wind and on the other hand has a strong tendency to dive when flying in the same direction as the wind. By experimentation it has been found that by attaching the guide line to the airplane at a point forward of the center of lift of the wings and the center of gravity of the machine, the sharp diving and climbing action will be considerably curbed, on account of the fact that when the plane starts to climb sharply, the guide line being attached, in front of the center of gravity and center of lift of the wings causes a downward pressure at this point which in turn acts to bring the nose of the airplane down into a slight diving attitude thus overcoming the climbing action and when the ship starts to dive in its flight away from the wind the guide line causes the nose of the ship to be raised slightly thus overcoming the diving action. Thus the operator can readily cause the plane to climb or dive at will by moving the guide line up or down.

It should be here stated that the guide line 9 need not necessarily be attached to the leading edge of the wing as shown in Figure 1 but may be attached to a suitable arm or similar structure which is connected directly to the fuselage and extending forwardly therefrom, it being only necessary that a rigid point be provided for attaching the guide line which point should be located outwardly from the axial line *a—a* and forwardly from the line *b—b*, which is the center of lift of the wings.

The drawings and description are illustrative merely, while the broad principle of the invention will be defined by the appended claims.

What I claim is:

1. The combination with a self-supporting miniature airplane having a propeller, a gasoline motor driving the propeller, a fuselage and lateral wings, or planes, of a guide line attached to the structure of the airplane at a point laterally of the longitudinal axis of the airplane.

2. The combination with a self-supporting miniature airplane having a fuselage and lateral wings, or planes, of a guide line attached to the structure of the airplane at a point forwardly of the center of lift of the wings and laterally of the fore and aft axis of the fuselage.

3. The combination with a self-supporting airplane having a propeller and motor for driving the propeller and also having lateral wings, or planes, of a controlling guide line attached to the structure at a point forwardly of the center of lift of the wings and laterally of the longitudinal axis of the airplane.

4. The combination with an airplane having a propeller and motor for driving the propeller and also having lateral wings, or planes, of a controlling guide line attached to the structure at a point forwardly of the center of lift of the wings and means operable from the guide line for controlling the operation of the motor.

5. The combination with an airplane having a propeller and motor for driving the propeller and also having lateral wings, or planes, of a controlling guide line attached to the structure at a point forwardly of the center of lift of the wings and laterally of the longitudinal axis of the airplane, and means operable from the guideline and effective, when operated, to cause stoppage of the motor.

6. The combination with a self-supporting miniature airplane having a fuselage and lateral wings, or planes, of a guide line attached to the structure of the airplane at a point forwardly of the center of lift of the wings and laterally of the fore and aft axis of the fuselage, and a pole at the other end of the guide line for elevating and lowering the guide line to vary the angle of the wings of the airplane relative to a horizontal plane to cause the airplane to vary its elevation above the ground.

7. The combination with a self-supporting airplane having a propeller and motor for driving the propeller and also having lateral wings, or planes, of a controlling guide line attached to the structure at a point forwardly of the center of lift of the wings and laterally of the longitudinal axis of the airplane, and a pole at the other end of the guide line for elevating and lowering the guide line to vary the angle of the wings of the airplane relative to horizontal plane to cause the airplane to vary its elevation above the ground.

VICTOR STANZEL.